United States Patent [19]

Sato et al.

[11] 4,313,844

[45] Feb. 2, 1982

[54] INORGANIC ION EXCHANGER

[75] Inventors: Hiroshi Sato, Hiroshima; Sadaaki Shigeta; Hiroyuki Uchida, both of Ootake, all of Japan

[73] Assignee: Mitsubishi Rayon Company, Ltd., Tokyo, Japan

[21] Appl. No.: 82,658

[22] Filed: Oct. 9, 1979

[51] Int. Cl.³ .................... C09K 3/00; C02F 1/42; B01J 39/10; B01J 41/10

[52] U.S. Cl. .................... 252/193; 252/179; 264/333; 423/DIG. 14

[58] Field of Search .............. 252/193, 179; 264/333; 423/DIG. 14

[56] References Cited

U.S. PATENT DOCUMENTS

| | | | |
|---|---|---|---|
| 1,934,091 | 11/1933 | Reichmann et al. | 264/333 X |
| 2,191,063 | 2/1940 | Smit | 252/179 |
| 2,208,173 | 7/1940 | Urbain et al. | 252/179 |
| 3,002,932 | 10/1961 | Duwell et al. | 252/179 |
| 3,522,187 | 7/1970 | Kraus | 252/193 X |

OTHER PUBLICATIONS

Amphlett: "Inorganic Ion Exchangers", Elsevier Publ. Co., Amsterdam, 1964, pp. 88–92.
Marei et al.: "Preparation of a New Inorganic Ion Exchanger . . .", Radiochem. Radioanal. Letters 11/3-4/pp. 187–191, Sep. 15, 1972.

*Primary Examiner*—Richard D. Lovering
*Attorney, Agent, or Firm*—Oblon, Fisher, Spivak, McClelland & Maier

[57] ABSTRACT

An inorganic ion exchanger prepared by kneading a blend of anatase type titanic acid or amorphous titanic acid with sulfuric acid, hydrochloric acid or phosphoric acid and water, extrusion molding the blend, and thereafter, heat treating the extruded product at an elevated temperature. The inorganic ion exchanger has high strength in water and is suitable for use in the removal or the concentration and recovery of injurious or beneficial materials contained in water.

8 Claims, No Drawings

INORGANIC ION EXCHANGER

FIELD OF THE INVENTION

The invention relates to an inorganic ion exchanger excellent in strength in water and suitable for use in the chemical separation at a high temperature of either injurious or beneficial materials contained in water.

BACKGROUND OF THE INVENTION

Techniques have recently been developed for efficiently carrying out the removal of injurious materials such as arsenic, chromium and the like from water containing such materials or the concentration and recovery of beneficial materials such as uranium and the like from water containing such materials, from the viewpoint of environmental purification or of effective exploitation of resources. Such injurious and beneficial materials exist in water generally as ions and, therefore, it is advantageous that they are separated from water by treatment with an ion exchanger. Particularly, inorganic ion exchangers are, as compared with organic ion exchangers, excellent in stability at a high temperature and under a strong radiation, and have, in most cases, selective ion exchange property for specific ions. Thus, inorganic ion are suitable for the treatment at a high temperature or the treatment of radioactive substances.

In general, it is necessary to form inorganic ion exchangers into a specifically shaped product of a proper size, particularly in the case where the inorganic ion exchangers are used by being packed into a column, in order to lower the resistance to the passage of liquids. In addition, such a shaped product is required to have strength in water, acid resistance and alkali resistance sufficient to withstand an operation such as a back wash, regeneration or the like. In order to form inorganic ion exchangers into a shaped product, known inorganic binders, such as silica sol, water-glass and the like, may be used. However, the shaped products obtained by the use of such inorganic binders are inferior in alkali resistance and have lower ion exchange capacity than that of the ion exchangers prior to being formed into shaped products.

On the other hand, for the forming of inorganic ion exchangers into a shaped product, organic binders such as natural and synthetic polymers may be used. However, the use of an organic binder produces shaped products inferior in heat resistance, acid resistance and alkali resistance. Thus, such shaped products have drawbacks in that they weld together or disintegrate during the treatment at a high temperature or during the regeneration treatment with a strong acid or a strong alkali.

It is the primary object of the present invention to provide an inorganic ion exchanger which has a high ion exchange capacity, is excellent in heat resistance, strength in water, acid resistance and alkali resistance and is useful for the treatment of water containing, as ions, injurious materials or beneficial materials.

DESCRIPTION OF THE INVENTION

The present invention provides an inorganic ion exchanger prepared by the process comprising mixing and kneading at least one titanic acid, selected from anatase type titanic acid, and amorphous titanic acid with water and at least one inorganic acid, selected from sulfuric acid, hydrochloric acid and phosphoric acid, and then extrusion molding the blend, and thereafter, heat treating the extruded product at a temperature of 50° to 500° C.

The titanic acids employed in the present invention are represented by the formula $TiO_2 \cdot nH_2O$, in which n is 0.5 to 2.0, and include anatase type titanic acid and amorphous titanic acid.

Titanic acids include, in general, those of rutile type, anatase type and amorphous crystal structures. However, the use of rutile type titanic acid produces a disadvantageous inorganic ion exchanger having low strength in water and poor ion exchange property. On the other hand, it has been found that the use of anatase type or amorphous titanic acid produces an inorganic ion exchanger having high strength in water and good ion exchange property. Particularly, where anatase type titanic acid is employed, there can be obtained an inorganic ion exchanger extremely excellent in acid resistance.

The titanic acids usable for the present invention may be obtained by heating an aqueous solution of titanium sulfate or of titanium tetrachloride and then hydrolyzing said solution, or by adding a base to the aqueous solution to neutralize it, and then, washing it with water, filtering and drying the resultant solid. Alternatively, the titanic acids may be obtained by hydrolyzing an alkoxide, such as tetrabutoxide, tetra-isopropoxide or the like, of titanium in water, and then, washing with water, filtering and drying the resultant solid.

The inorganic acids usable for the present invention include sulfuric acid, hydrochloric acid and phosphoric acid. The use of these inorganic acids produces an inorganic ion exchanger which is excellent in acid resistance and alkali resistance, but which does not degrade the ion exchange capacity when it is extruded. The effects of the addition of the inorganic acid are remarkable where sulfuric acid, hydrochloric acid or phosphoric acid is employed; whereby when another inorganic acid, for example, silicic acid, is employed, the alkali resistance and the ion exchange capacity of the resultant inorganic ion exchanger becomes very low. The inorganic acids may preferably be added in an amount ranging from 0.1 to 7.2 moles per 8 moles of titanic acid. More preferably, 0.3 to 3.0 moles of sulfuric acid (as $H_2SO_4$), 1.2 to 2.4 moles of hydrochloric acid (as HCl) or 1.2 to 3.6 moles of phosphoric acid (as $H_3PO_4$) may be added per 8 moles of titanic acid. If the inorganic acid is added in an amount of less than 0.1 mole per 8 moles of titanic acid, the resultant inorganic ion exchanger has disadvantageously low strength in water. While if the inorganic acid is added in an amount of more than 7.2 moles per 8 moles of titanic acid, it becomes difficult to carry out the extrusion molding due to the remarkable increase of the viscosity and the separation of the solid and the liquid in the blend during the kneading and; in addition, there is inconvenience in that excessive inorganic acid bleeds out onto the surface of the inorganic ion exchanger, thus causing the surface to become tacky due to the absorption of moisture, which occurs even after the heat treatment at a high temperature, and particularly in the case where sulfuric acid or phosphoric acid is employed.

The amount of water to be added may preferably be 1 to 50 moles per 8 moles of titanic acid. More preferably, the amount may be varied more or less depending upon the type of the extrude used, the aperture of the die or screen used, the extrusion speed, the amount of the added inorganic acid or the like. For example, where the inorganic acid is added in an amount of not more than 2 moles per 8 moles of titanic acid, it is preferred to add water in an amount of 20 to 50 moles per 8 moles of titanic acid.

The kneading of the blend of the titanic acid, the inorganic acid and the water may be carried out in a batch type or continuous type kneader. The blend may preferably be molded by a pelletizer of a type such that the blend is molded under pressure, such as a screw type extrusion pelletizer, roll type extrusion pelletizer or blade type extrusion pelletizer. By such extrusion molding, an inorganic ion exchanger, having a strength much higher than that of an inorganic ion exchanger obtained by merely drying the blend or by drying and heat treating the blend, can be obtained. The particle diameters of the pellets obtained by the extrusion molding may be in a range of from 0.1 to 5.0 mm by appropriately selecting the diameter of the bores of the die or screen of the pelletizer.

Then, the molded pellets are heat treated to obtain the inorganic ion exchanger of the invention. It is suitable to carry out the heat treatment at a temperature of from 50° to 500° C. Where the heat treatment temperature is higher than 500° C., the resultant inorganic ion exchanger may be very low in ion exchange capacity. Where the temperature is lower than 50° C., the resultant inorganic ion exchanger may have a low strength. In order to obtain an inorganic ion exchanger excellent in both the strength in water and the ion exchange capacity, it is particularly preferable to carry out the heat treatment at a temperature of from 100° to 400° C. As shown in the following examples, the heat treatment is carried out for 3 to 19 hours.

In the case where the inorganic ion exchanger of the present invention is to be used by being packed into a column through which polluted water to be treated is passed, the inorganic ion exchanger of the pelletized form may be used as such, or after grinding and dressing it or forming it into a globular form.

The inorganic ion exchanger of the present invention is excellent in heat resistance, acid resistance, alkali resistance, has high strength in water, good ion exchange property, and, in addition, has very high ion exchange speed. Further, in the present invention, it is possible to greatly change the ion exchange capacity of the resultant inorganic ion exchanger by selecting the inorganic acid to be used. Thus, the inorganic ion exchanger obtained by the use of sulfuric acid or hydrochloric acid is particularly excellent in selective ion exchange property for alkaline earth metal cations and polyvalent anions. Examples of the alkaline earth metal cations include radium, barium, strontium and calcium ions and examples of the polyvalent anions include arsenate, arsenite, chromate, phosphate, uranyl, molybdate, tungstate and vanadate ions. The inorganic ion exchanger is particularly useful for the removal or the concentration and recovery of these polyvalent anions in an aqueous system containing a large amount of chloride ion, bromide ion or the like. On the other hand, the inorganic ion exchanger obtained by the use of phosphoric acid is excellent in selective ion exchange property for metal cations, such as cesium, rubidium, silver, potassium and barium ions. Thus, the inorganic ion exchanger is useful for the removal or the concentration and recovery of these cations and can be utilized for the separation of alkali metal cations or of alkaline earth metal cations.

The inorganic ion exchanger according to the present invention has high strength in water and is stable at pH values in a wide range. Thus, the inorganic ion exchanger can be subjected to the back wash and the regeneration, which is usual in conventional ion exchange resins; and as a regenerant, there can be used hydrochloric acid, sulfuric acid, sodium hydroxide, potassium hydroxide, sodium carbonate, ammonium carbonate, aqueous ammonia and the like.

Upon the use of the inorganic ion exchanger of the present invention for the removal of injurious materials or the concentration and recovery of beneficial materials, a so-called slurry technique, in which the inorganic ion exchanger is suspended in water containing the injurious or beneficial materials and then filtered, can be utilized. A packed column technique, in which water containing the injurious or beneficial materials is passed through a column packed with the inorganic ion exchanger, can also be utilized.

INDUSTRIAL APPLICABILITY

The inorganic ion exchanger can be applied, by the utilization of the above-mentioned features, to the removal of arsenic contained in underground water, geothermal hot water, waste water from ore treatment and the like, the removal of phosphorus from plant waste water, the removal or recovery of radium or uranium from waste water from uranium smelting, and the recovery of chromium from plating waste water.

The invention will further be illustrated by the following non-limitative examples.

EXAMPLE 1

Anatase type titanic acid ($TiO_2.H_2O$), water and sulfuric acid, hydrochloric acid or phosphoric acid were blended at the proportions shown in Table 1 below. The blend was then well kneaded in a kneader and formed into pellets, having a length of 3 to 7 mm and a diameter of 0.5 mm, on a screw type extrusion pelletizer provided with a screen having bores of a diameter of 0.5 mm. The molded pellets were heat treated in hot air at 110° C. for 16 hours and then in an electric oven at 300° C. for 3 hours to obtain a pelletized inorganic ion exchanger.

To evaluate the strength of the obtained inorganic ion exchanger, 300 cc of hot water of 90° C. was charged into a 300 cc beaker and 10 g of the inorganic ion changer was immersed into the hot water and agitated for 5 hours in a jar tester at a rotational speed of 150 r.p.m. Then, the inorganic ion exchanger was filtered off, heat treated in an electric oven at 300° C. for 3 hours and then sieved with a 48 mesh Tyler standard sieve. The percentage (by weight) of the powder formed by the hot water treatment and passed through the sieve was determined as a powdering percentage. The determined powdering percentage is shown in Table 1 as a measure of the strength.

Further, to evaluate the alkali resistance and the acid resistance of the inorganic ion exchanger, 1 g of the inorganic ion exchanger was immersed into 50 cc of a 25% aqueous sodium hydroxide solution or concentrated sulfuric acid and the liquid was left to stand for 24 hours while periodically being shaked. Then, the change of the shape of the pellets was observed. The results are also shown in Table 1.

For comparison, anatase type titanic acid as mentioned above was blended with silica sol (moisture content of 80%) or an aqueous sodium silicate solution (moisture content of 68%) at the proportions as shown in Table 1 and the blend was treated in the manner as mentioned above to obtain a comparative inorganic ion exchanger. The obtained comparative inorganic ion exchanger was then subjected to the above-mentioned evaluation tests. The results are also shown in Table 1.

TABLE 1

| Composition of Charged Material | | | | | | Powdering Percentage (%) | Alkali Resistance | Acid Resistance | Remarks |
|---|---|---|---|---|---|---|---|---|---|
| Amounts | | | Moles | | | | | | |
| Titanic acid 784 g | /Concentrated sulfuric acid /67 cc | /Water /400 cc | Titanic acid 8 | /Concentrated sulfuric acid /1.26 | /Water: /22.2 | 0 | Not changed | Not changed | The invention |
| Titanic acid 784 g | /Concentrated hydrochloric acid /100 cc | /Water: /350 cc | Titanic acid 8 | /Concentrated hydrochloric acid /0.96 | /Water: /19.4 | 3 | Not changed | Not changed | The invention |
| Titanic acid 784 g | /Phosphoric acid /160 cc | /Water: /300 cc | Titanic acid 8 | /Phosphoric acid /3 | /Water: /16.7 | 0 | Not changed | Not changed | The invention |
| Titanic acid 700 g | /Silica sol: /300 g | | — | | | 5 | Dis-integrated | Dis-integrated | Comparison |
| Titanic acid 700 g | /Aqueous sodium silicate solution: /300 g | | — | | | 100 | Dis-integrated | Dis-integrated | Comparison |

EXAMPLE 2

The procedure as in Example 1 was repeated using amorphous titanic acid, sulfuric acid and water at the proportions shown in Table 2 below to obtain a pelletized inorganic ion exchanger. The strength of the obtained inorganic ion exchanger was evaluated in the manner as in Example 1. The results are shown in Table 2.

To evaluate the ion exchange property of the inorganic ion exchanger, 100 cc of an aqueous arsenic acid solution containing 100 ppm of arsenic was charged into a sample bottle and 1.0 g of the inorganic ion exchanger was added to the solution and immersed into the solution at 40° C. for 3 hours while stirring. Then, the amount of the arsenic retained in the solution was determined. The results are also shown in Table 2.

TABLE 2

| Composition (Mole Ration) | | | Powdering Percentage (%) | Amount of Retained Arsenic (ppm) |
|---|---|---|---|---|
| Titanic acid | Concentrated /sulfuric acid | /Water | | |
| 8 | /0.05 | /40 | Disintegrated immediately after the soaking into water | 14.0 |
| 8 | /0.1 | /40 | 10 | 4.5 |
| 8 | /0.4 | /40 | 2 | 4.2 |
| 8 | /1.2 | /40 | 0 | 3.47 |
| 8 | /2.4 | /40 | 0 | 3.5 |
| 8 | /7.2 | /40 | 0 | 8.55 |
| 8 | /15 | /0 | Particles were bonded to each other due to moisture absorption | — |

COMPARATIVE EXAMPLE 1

Amorphous titanic acid powder of particle diameters of 30 to 100 m, which was obtained from the same amorphous titanic acid as used in Example 2, was subjected to the test for the ion exchange property as mentioned in Example 2. The determined amount of the retained arsenic was 40 ppm. Thus, it was proved that the ion exchange property of the amorphous titanic acid powder was fairly inferior to that of the inorganic ion exchanger of the present invention as in Example 2.

Amorphous titanic acid powder, the same as used in the above, was charged into a mold and press molded under a pressure of 1000 kg/cm$^2$ into a disc. The disc was then ground and sieved to produce a granular material of particle sizes of 16 to 48 mesh. The granular material was then subjected to the tests for strength in hot water as in Example 1 and for the ion exchange property as in Example 2. The powdering percentage was 74% and the amount of the retained arsenic was 68 ppm. Thus, it was proved that the strength was fairly inferior to that of the inorganic ion exchanger of the present invention and that the ion exchange property was further inferior to that of the amorphous titanic acid powder as mentioned above.

EXAMPLE 3

A pelletized inorganic ion exchanger was prepared in the manner as in Example 1, except that 800 g of anatase type titanic acid, 67 cc of concentrated sulfuric acid and 400 cc of water were used and the heat treatment was carried out under the conditions shown in Table 3 below. The powdering percentage was evaluated, as in Example 1, and the amount of the retained arsenic was evaluated, as in Example 2, and the results are shown in Table 3.

TABLE 3

| Heat Treatment Condition | Powdering Percentage (%) | Amount of Retained Arsenic (ppm) | Remarks |
|---|---|---|---|
| 110° C., 16 hrs. | 5.2 | 0.49 | |
| 200° C., 3 hrs. | 1.0 | 0.54 | |
| 300° C., 3 hrs. | 0.5 | 0.70 | |
| 500° C., 3 hrs. | 5.6 | 2.53 | |
| 700° C., 3 hrs. | 7.1 | 89.0 | Disintegrated upon soaking in water |

COMPARATIVE EXAMPLE 2

726 g (8 moles) of rutile type titanic acid (TiO$_2$.0.6 H$_2$O), 67 cc (1.26 moles) of concentrated sulfuric acid and 400 cc (22.2 moles) of water were blended. The blend was then well kneaded in a kneader and formed into pellets, having a length of 3 to 5 mm and a diameter of 0.5 mm, on a screw type extrusion pelletizer provided with a screen having bores of a diameter of 0.5 mm. The molded pellets were heat treated in hot air at 110° C. for 16 hours and then in an electric oven at 300° C. for 3 hours.

The powdering percentage of the granular material evaluated, as in Example 1, was 100% and the amount of the retained arsenic evaluated, as in Example 2, was 98 ppm. Thus, it was proved that the use of the rutile type titanic acid could not produce an inorganic ion exchanger satisfactory in strength in hot water and in the ion exchange property.

EXAMPLE 4

7.83 kg (80 moles) of anatase type titanic acid ($TiO_2 \cdot H_2O$), 340 cc (6.4 moles) of concentrated sulfuric acid and 5.18 l (288 moles) of water were well kneaded in a kneader and formed into pellets, having a length of 2 to 7 mm and a diameter of 1.0 mm, on a screw type extrusion pelletizer provided with a screen having bores of a diameter of 1.0 mm. The molded pellets were heat treated at 110° C. for 16 hours and then at 300° C. for 3 hours to obtain a pelletized inorganic ion exchanger.

The inorganic ion exchanger was packed into a column of an inner diameter of 50 mm and a length of 1500 mm to a height of 1000 mm. Then, an aqueous solution of $K_2HPO_4$ containing 50 ppm of $PO_4^{---}$ was passed through the column at a S.V. (space velocity) of 10. The concentration of $PO_4^{---}$ in the effluent solution was maintained below 0.3 ppm over the course of 50 hours.

We claimed:

1. An inorganic ion exchanger prepared by the process consisting of: mixing and kneading at least one titanic acid, selected from the group consisting of anatase type titanic acid and amorphous titanic acid, with water and at least one inorganic acid, selected from the group consisting of sulfuric acid, hydrochloric acid and phosphoric acid, extrusion molding the mixture, and, thereafter, heat treating the extruded product at a temperature of 50° to 500° C. for 3 to 19 hours.

2. An inorganic ion exchanger according to claim 1, wherein an inorganic acid is added in an amount of 0.1 to 7.2 moles per 8 moles of the titanic acid.

3. An inorganic ion exchanger according to claim 1, wherein sulfuric acid is added in an amount of 0.3 to 3.0 moles per 8 moles of the titanic acid.

4. An inorganic ion exchanger according to claim 1, wherein hydrochloric acid is added in an amount of 1.2 to 2.4 moles per 8 moles of the titanic acid.

5. An inorganic ion exchanger according to claim 1, wherein phosphoric acid is added in an amount of 1.2 to 3.6 moles per 8 moles of the titanic acid.

6. An inorganic ion exchanger according to claim 1, wherein water is added in an amount of 1 to 50 moles per 8 moles of the titanic acid.

7. An inorganic ion exchanger according to claim 1, heat treated at a temperature of 100° to 400° C.

8. An inorganic ion exchanger according to claim 1, in the form of pellets having a particle diameter of 0.1 to 5 mm.

* * * * *